Patented Feb. 8, 1944

2,341,363

UNITED STATES PATENT OFFICE 2,341,363

CONVERSION OF HYDROCARBON OILS

Gerald C. Connolly, Baton Rouge, La., assignor to Standard Oil Development Company, a corporation of Delaware No Drawing. Application December 27, 1940, Serial No. 371,999

6 Claims. (Cl. 196—52)

This invention relates to the catalytic conversion of hydrocarbon oils and pertains more particularly to catalysts adapted for the cracking of such oils and to a method of preparing the catalyst.

This application forms a continuation-in-part of an earlier filed application Serial No. 276,799, filed June 1, 1939.

In the above-named application, I have disclosed a catalyst for cracking hydrocarbon oils consisting principally of alumina and boron oxide in which the amount of boron oxide present may be between 5% and 40% and preferably between 10% and 25%.

I have now found that, to obtain catalysts having the highest order of activity, the alumina should be subjected to a peptizing treatment. This peptizing treatment may consist, for example, in treating the alumina with a peptizing agent such as a dilute solution of a weak acid and preferably an organic acid, such as formic, acetic or chloracetic, and the like. While the treatment may take place after the addition of the boron oxide, it is preferred to first treat the alumina with the peptizing agent before the addition of the boron oxide.

The alumina which is subjected to the peptizing treatment may be alumina gel, gelatinous alumina, or it may be any of the commercial grades of alumina or aluminum hydrates. Such commercial grades of alumina may be, for example, bauxite, activated alumina, or the like. From the standpoint of activity, it is preferred to use alumina gels or gelatinous precipitates of alumina having an extended capillary structure as will be shown by the examples hereinafter. However, from the standpoint of cost, it may be desirable to employ cheaper grades of commercial alumina or aluminum hydrates.

The peptizing treatment is preferably accomplished by placing the alumina in a suitable mechanical mixer and then adding sufficient peptizing agent to thoroughly wet the mixture during the mixing operation. When employing acetic acid of a concentration of from 4% to 16%, one liter of the acetic acid solution is usually sufficient to peptize 6 kilograms of gelatinous precipitate of alumina. After thoroughly mixing the alumina and the peptizing agent for a period of about an hour, for example, the product may be transferred to a drier and carefully dried at a temperature below 212° F. Following this the boron oxide may be added by treating the resulting product with a solution of boric acid or by mechanically mixing boron oxide with the dried peptized alumina.

The relative proportions of boron oxide and alumina present in the final catalyst should be between 10 and 30% and preferably about 20%. It has been found, for example, that the activity of the catalyst increases with the boron oxide content up to about 20% and then tends to drop off as the boron oxide content continues to increase. This will be apparent from the examples set forth hereinafter.

The catalyst of the character above described may be moulded into units of uniform size or it may be used in the form of granules of uniform size, or in the form of powder. In the latter case the catalyst may be injected into the stream of oil vapors to be cracked.

The following examples serve to illustrate the character of the catalyst prepared according to the present invention. In each of the examples the activity of the catalyst for cracking hydrocarbon oils was determined by passing an East Texas gas oil of 33.8° A. P. I. gravity in contact with the catalyst at a temperature of 850° F. and at a feed rate of .6 volume of liquid oil per volume of catalyst per hour. The length of the cracking treatments between regeneration was two hours.

*Example 1*

A solution of aluminum sulfate was first treated with ammonium hydroxide to form a gelatinous precipitate of alumina. The resulting precipitate was then washed substantially free of sulfate ions and the washed product transferred to a mechanical mixer into which was added acetic acid in an amount of about 1 liter of a 16 percent acetic acid solution to about 6 kilograms of precipitate. After mixing for about an hour the product was transferred to a drier and carefully dried at a temperature below 210° F. Separate portions of the resulting product were impregnated with boric acid having concentrations sufficient to form catalyst having a boron oxide content of 5%, 10%, 15%, 20%, and 25%. This product was then dried, slowly heated to a temperature of 800% F. and activated for a period of about 3 hours. At times it has been found advantageous to heat the alumina to decompose the acetic acid preliminarily to the incorporation of the boron oxide.

This product when tested in the form of pellets under the above conditions resulted in yields of gasoline of 28.5%, 37.0%, 48.5%, 51.0%, and 45.5%, respectively.

It will be apparent from the tests reported in this example that catalysts having a higher order of activity for cracking hydrocarbon oils can be prepared according to the method set forth in this application and that for maximum yield of gasoline concentration, the boron oxide content of the catalyst should preferably be from about 15 to 20%.

*Example 2*

A gelatinous precipitate of alumina was prepared as described in Example 1. This precipitate prior to the drying treatment was treated with boric acid solution of a concentration sufficient to produce a catalyst having a boron oxide content of about 10%. This product was then dried as described in Example 1 and tested under the conditions hereinbefore described without any peptizing treatment of the alumina. In this case a gasoline yield of about 28.5% was obtained under test conditions.

From a comparison of these two examples, it is apparent that the peptizing treatment materially improves the activity of the catalyst.

Example 3

A commercial grade of powdered aluminum hydrate was treated with boric acid of a concentration sufficient to give a catalyst having a boron oxide content of about 15%. This product was then moulded in the form of pellets and tested under the conditions previously set forth, with the result that about 28.5% of the oil was converted into gasoline.

Example 4

The same powdered aluminum hydrate as in Example 3 was treated with 10 percent by weight of acetic acid and then after a period of digestion heated to 850–900° F. to decompose the acetic acid. This product was then treated with boric acid solution sufficient to give a boron oxide content of about 15%. The product, when moulded into pellets and tested as in the previous examples, resulted in a gasoline yield of 45%.

By comparison of the Examples 3 and 4, it will be apparent that the peptizing treatment improved the yield from 28.5% up to 45%.

Example 5

A commercial grade of bauxite was treated directly with a boric acid solution of a concentration sufficient to give about 15% of boron oxide in the final catalyst. This product, when moulded into pellets and tested under the conditions described, resulted in a gasoline yield of 11%.

Example 6

The same bauxite employed in Example 5 was placed in a mechanical mixer and treated with acetic acid as described in Example 4. This product was then treated with boric acid solution of a concentration sufficient to give a final catalyst having about 15% of boron oxide. This product, when tested under the conditions mentioned above, resulted in a gasoline yield of about 35.0%.

While I have described a catalyst consisting exclusively of alumina and boria, it will be understood that the invention contemplates the addition of small amounts of other material which may or may not act as activating agents, stabilizers, and promoters. Among such agents may be mentioned the oxides of cerium, magnesium, uranium, manganese, thallium and tungsten.

It will be apparent from the examples hereinbefore described that the peptizing treatment materially improves the activity of the catalyst for the cracking of hydrocarbon oils.

Having described the preferred embodiment of the invention, it will be understood that it embraces such other variations and modifications as come within the spirit and scope thereof.

I claim:

1. A catalyst for cracking hydrocarbon oils comprising alumina and boron oxide formed by subjecting alumina to a peptizing treatment, and thereafter incorporating boron oxide therewith, in which catalyst the amount of boron oxide is between 10% and 30%.

2. A catalyst for the cracking of hydrocarbon oils comprising alumina and boron oxide formed by first treating alumina with an acetic acid solution to thereby peptize the alumina into a gel and thereafter combining the boron oxide with the alumina.

3. A method of cracking hydrocarbon oils which comprises passing the oil to be cracked in vapor form through a cracking zone maintained at cracking temperature, and subjecting the oil within said cracking zone to the action of a catalyst comprising alumina and boron oxide formed by first treating the alumina with a peptizing agent before combining the boron oxide therewith.

4. The invention defined in claim 3 wherein the peptizing agent employed for treating the alumina is acetic acid.

5. The invention defined in claim 3 wherein the amount of boron oxide in the catalyst is between 10% and 30%.

6. The invention defined in claim 3 wherein the peptizing agent is acetic acid and the amount of boron oxide in the catalyst is about 20%.

GERALD C. CONNOLLY.